United States Patent
Larrison

(10) Patent No.: US 9,633,532 B1
(45) Date of Patent: Apr. 25, 2017

(54) AUTOMATED RAINWATER COLLECTION SYSTEM CONTROLLER

(71) Applicant: John Larrison, Georgetown, TX (US)

(72) Inventor: John Larrison, Georgetown, TX (US)

( * ) Notice: Subject to any disclaimer, the term of this patent is extended or adjusted under 35 U.S.C. 154(b) by 0 days.

(21) Appl. No.: 15/168,770

(22) Filed: May 31, 2016

Related U.S. Application Data

(60) Provisional application No. 62/168,229, filed on May 29, 2015.

(51) Int. Cl.
| | |
|---|---|
| G08B 21/00 | (2006.01) |
| G08B 5/36 | (2006.01) |
| H05K 7/14 | (2006.01) |
| G08B 21/18 | (2006.01) |
| G08B 21/20 | (2006.01) |
| E03B 3/03 | (2006.01) |
| E03B 11/00 | (2006.01) |

(52) U.S. Cl.
CPC ............ *G08B 5/36* (2013.01); *G08B 21/182* (2013.01); *G08B 21/20* (2013.01); *H05K 7/1427* (2013.01); *E03B 3/03* (2013.01); *E03B 11/00* (2013.01)

(58) Field of Classification Search
CPC ............ G08B 5/36; G05D 7/00; G05D 11/00
USPC ....... 340/581, 3.1, 3.22, 3.5, 3.52, 601, 602, 340/4.3, 4.35, 309.16; 700/19, 20, 284; 239/69; 137/78.2, 78.3
See application file for complete search history.

(56) References Cited

U.S. PATENT DOCUMENTS

| | | | |
|---|---|---|---|
| 3,721,254 A | 3/1973 | Rutten | |
| 4,130,382 A | 12/1978 | Bode | |
| 4,488,568 A | 12/1984 | Hasenbeck | |
| 4,567,563 A | 1/1986 | Hirsch | |
| 4,613,764 A | 9/1986 | Lobato | |
| 6,076,740 A | 6/2000 | Townsend | |
| 7,165,730 B2 | 1/2007 | Clark et al. | |
| 7,640,079 B2 * | 12/2009 | Nickerson | A01G 25/16 239/69 |
| 8,565,904 B2 * | 10/2013 | Bragg | A01G 25/165 700/18 |
| 8,606,415 B1 * | 12/2013 | Woytowitz | A01G 25/167 239/69 |
| 9,244,449 B2 * | 1/2016 | Tennyson | G05B 19/02 |
| 2003/0179102 A1 | 9/2003 | Barnes | |

* cited by examiner

*Primary Examiner* — Toan N Pham
(74) *Attorney, Agent, or Firm* — Robert C. Montgomery; Montgomery Patent & Design, LP.

(57) ABSTRACT

A rainwater collection system utilizes an electronic controller in electrical communication with a plurality of water sensors. Some of the sensors are configured to measure the presence of rainwater, the depth of rainwater within a vessel and the temperature of the rainwater. The controller is programmed to permit fluid communication between the vessel and a plurality of pumps, valves and pipes.

20 Claims, 8 Drawing Sheets

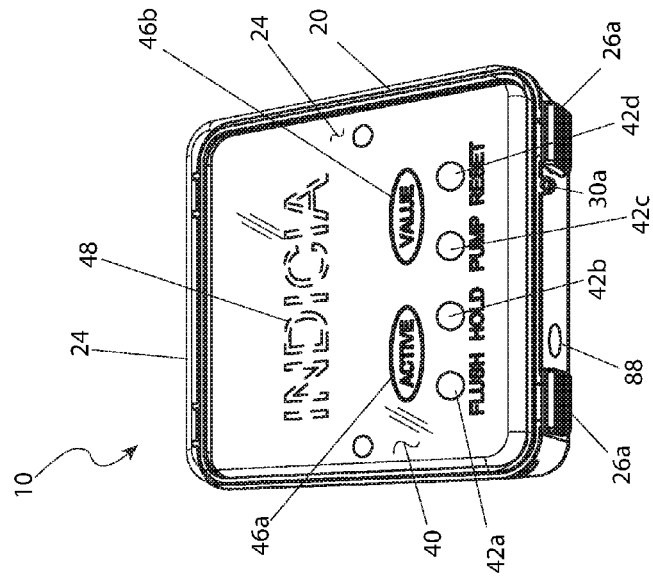
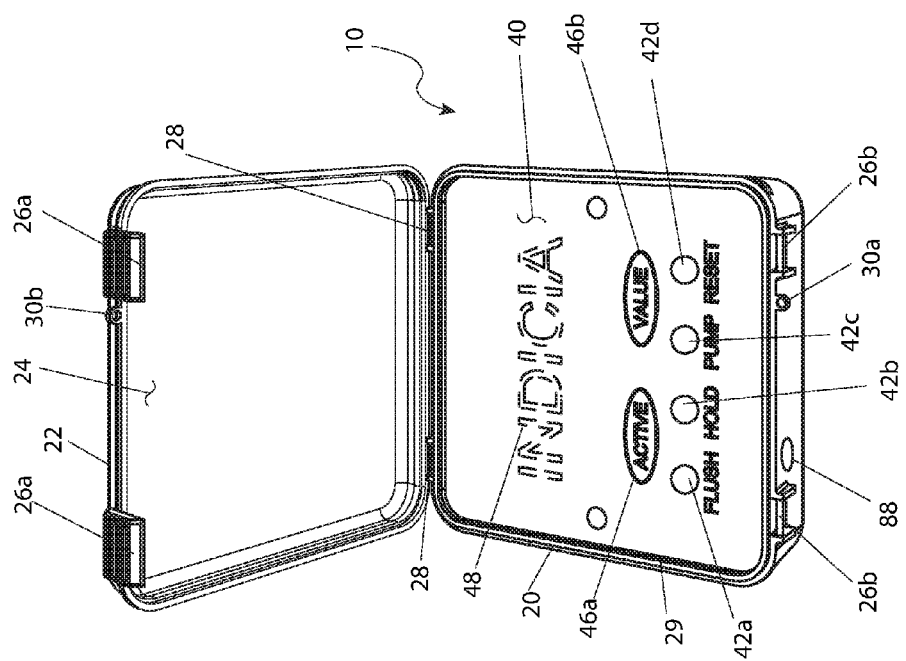
FIG. 3B
FIG. 3A

AUTOMATED RAINWATER COLLECTION SYSTEM CONTROLLER

RELATED APPLICATIONS

The present invention was first described in and claims the benefit of U.S. Provisional Application No. 62/168,229 filed May 29, 2015, the entire disclosures of which are incorporated herein by reference.

FIELD OF THE INVENTION

The present invention relates generally to a rainwater collection system device utilizing an electronic controller programmed to permit fluid communication between a collection vessel and downstream usage.

BACKGROUND OF THE INVENTION

Many areas of the world rely upon the collection and use of reclaimed precipitation as a primary source of usable water. Cisterns and other devices are utilized for purposes of collecting and storing water runoff from impervious surfaces such as the rooftops of dwellings. While generally unpotable, such systems provide a useful source of water for tasks such as irrigation, washing cars or driveways, and the like.

There exists means to treat such rainwater to make it potable. These potable systems; however, require frequent monitoring and near constant servicing. Therefore, locations that rely on such potable rainwater collection systems would benefit from an automatic controller system.

Many such cisterns and other similar rainwater recollection systems store the water in a stagnant, manually accessed manner Items such as pails or buckets are often the only means of accessing and transporting the water. Because rainfall events are generally unpredictable it would be beneficial to have an automated system that assists in the collection of the rainwater into such a cistern, operates with an existing well as a fallback supply, learns and peak usages and manages emergent situations, and other similar functions. The rainwater collection system controller accomplishes this task in a manner that is both efficient, reliable and easy.

SUMMARY OF THE INVENTION

The present invention advantageously fills the aforementioned deficiencies by providing a controller which is configured to be in electrical communication with a rainwater collection system. The controller is comprised of an enclosure base defining an interior, a lid removably secured above an opening within the enclosure base which fully covers the interior and an operator panel which is supported within the interior of the enclosure base. The operator panel is comprised of a plurality of lamps which are disposed within a first face of the operator panel and a plurality of actuators which are also disposed within the first face of the operator panel and are situated adjacent to the plurality of lamps.

The controller is also comprised of three (3) circuit boards and a remote display module. The first circuit board is secured to a second face of the operator panel on the opposite side of the first face. The first circuit board is in electrical communication with the plurality of lamps and the plurality of actuators. The second circuit board is secured to a bottom interior portion of the enclosure base. The second circuit board is in electrical communication with the first circuit board and comprises software which is stored within. The third circuit board is secured to a bottom interior portion of the enclosure base and is adjacent to the second circuit board. The third circuit board is in electrical communication with the first and second circuit boards and a power source. The remote display module is in electrical communication with the operator panel. In a separate embodiment, the remote display module is configured to be in wireless communication with the operator panel.

The operator panel is configured to be in electrical communication with a plurality of data collecting sensors of the rainwater collection system. The plurality of lamps displays sensed data from the data collecting sensors. The first circuit board supports the operator panel and supplies power to the plurality of lamps and the plurality of actuators. The plurality of actuators enable navigation of software stored within the second circuit board, thereby permitting a user to actuate any one of a plurality of components of the rainwater collection system in response to sensed data from the data collecting sensors. The third circuit board performs power conversion and power management for the controller.

The operating panel may further comprise a pair of lamps and four (4) actuators. The first lamp which is configured to illuminate when the rainwater collection system is waiting to operate, has sensed any actuator has been depressed, or the data collecting sensors display information relative to a condition of a component of the rainwater collection system. The second lamp is configured to illuminate when any pump of the rainwater collection system needs to be in operation based on an operating value stored in the software, when a tank of the rainwater collection system requires overflow management or when ambient air about the rainwater collection system reaches a pre-set temperature stored on the software. The first actuator is configured to display on the remote display an amount of rainwater which is ready to flush from the rainwater collection system prior to collection of fresh rainwater and subsequently flush that amount. The second actuator is configured to display on the remote display an amount of time by which to hold off a rainwater collection system flush after no rainwater is detected in any rainwater collection system tank. The third actuator is configured to selectively activate any pump of the rainwater collection system. The fourth actuator is configured to activate the rainwater collection system and perform a full re-boot of the controller.

In addition to the above, the operating panel may also comprise a flush actuator which is configured to be in electrical communication with a flush valve which itself is in fluid communication with a rainwater supply line, a flush water line and a given cistern of the rainwater collection system and a pressure pump actuator which is configured to be in electrical communication with a pressure pump which is itself in fluid communication with the cistern and a usage line. The first lamp is illuminated when the sensed moisture reaches a pre-set moisture value stored in the software while the second lamp is illuminated when the ambient temperature reaches a pre-set temperature value likewise stored in the software.

Furthermore, the operating panel may also be in electrical communication with a staging tank overflow sensor which is configured to be in communication with a staging tank of the rainwater collection system, a staging tank full sensor which is configured to be in communication with the staging tank, a staging pump controller which is configured to be in communication with a staging pump of the rainwater collection system and in fluid communication between the staging tank and the cistern, a cistern full sensor which is configured to be in communication with the cistern; a freeze sensor which is configured to be in communication with the rainwater collection system and is capable of measuring and transmitting data regarding sensed ambient temperature in proximity to the freeze sensor and a rain sensor which is configured to be in communication with the rainwater collection system and is capable of measuring and transmitting data regarding sensed moisture in proximity to the rain sensor. Activation of the third actuator selectively starts or stops the aforementioned staging pump.

The remote display module may comprise a remote display enclosure, a pair of mounting ears each of which are secured on an opposing side of the remote display enclosure, a mounting aperture secured within each of the mounting ears, a cover and a plurality of remote display lamps which are disposed within a face of the remote display enclosure and subjacent to the cover. The remote display lamps are each in electrical communication with the second circuit board and are configured to correspond to a single assigned component of the rainwater collection system and a single assigned data collecting sensor. Each of the remote display lamps is illuminated when a respective component of the rain water collection system is activated and when sensed data from a respective data collecting sensor matches a pre-set value stored on the software.

The plurality of remote display lamps may further comprise of a first remote lamp, a second remote lamp, a third remote lamp and a fourth remote lamp. With this configuration, the first, second, third and fourth remote lamps comprise different colors and are capable of flashing a pattern when activated.

The lid of the controller may comprise of a transparent body, a pair of hinges on a first side of the body, a pair of latch hooks secured on a side of the body opposite the first side and a first pad lock aperture which is adjacent to an interior side of one (1) of the latch hooks. The enclosure base of the controller may comprise of a pair of latch bars which are positioned to be removably secured to each latch hook placed therein when the lid is in a closed position. The enclosure base may also comprise a second pad lock aperture which adjacent to an interior side of one (1) the latch bars. The second pad lock aperture is positioned to align with the first pad lock aperture. The controller may have a power supply which is both AC and DC.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3a is a perspective view of the rainwater collection system controller 10 depicting a lid portion 22 in an open state, according to a preferred embodiment of the present invention;

FIG. 3b is a perspective view of a rainwater collection system controller 10 depicting a lid portion 22 in a closed state, according to a preferred embodiment of the present invention;

Figure 1:
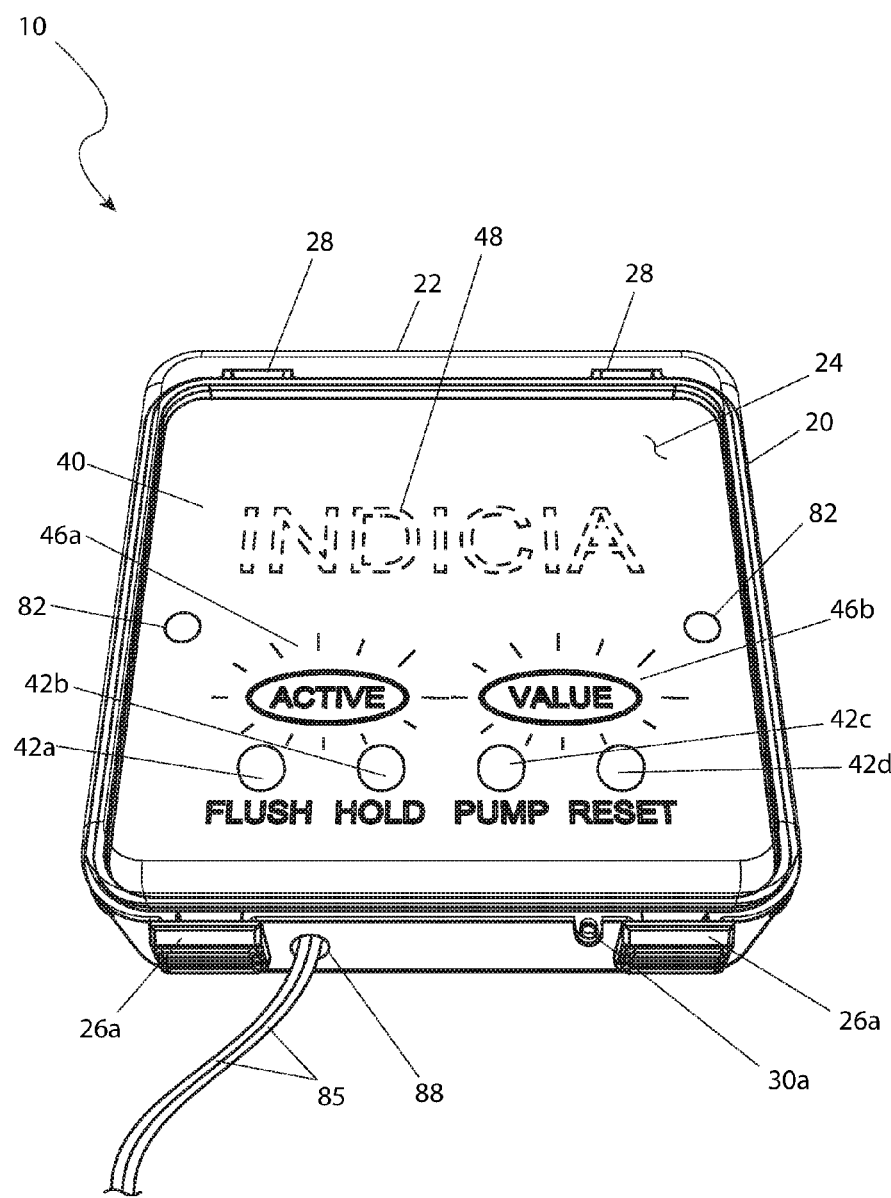
FIG. 1 is a perspective view of a rainwater collection system controller 10, according to a preferred embodiment of the present invention.

DESCRIPTIVE KEY 10 rainwater collection system controller
20 enclosure base
22 enclosure lid
24 lid front cover
26a latch hook
26b latch bar
28 hinge
29 gasket
30a first padlock aperture
30b second padlock aperture
32 enclosure floor
34 standoff post
36 grommet
40 operator panel
42a first pushbutton
42b second push button
42c third push button
42d fourth push button
46a first lamp
46b second lamp
48 indicia
50 first circuit board
52 wire connector
60 second circuit board
62 third circuit board
80 fastener
82 fastener aperture
85 wiring
86 alternating current (AC) power supply
87 direct current (DC) power supply
88 wiring aperture
90 remote display module
92 remote display enclosure
94 cover
96a first remote lamp
96b second remote lamp
96c third remote lamp
96d fourth remote lamp
98 mounting ear
99 mounting aperture
100 rainwater collection system
101 alternate rainwater collection system
105 freeze sensor
110 rain sensor
112 rainwater supply line
113 flush water line
115 flush valve 117 valve actuator
120 staging tank
122 staging tank overflow sensor
124 staging tank full sensor
126 staging pump controller
128 staging pump
130 cistern
132 cistern full sensor
133 pressure pump controller
134 pressure pump
140 usage system line

DETAILED DESCRIPTION OF THE
PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a rainwater collection system controller (herein described as the "apparatus") 10, which provides a rainwater automation means, being an integral portion of a rainwater collection system 100 envisioned to receive rain water from an existing building gutter system which is then pumped into a cistern 130 for eventual use by a user. The apparatus 10 utilizes a molded plastic electrical enclosure 20, 22 containing electrical and electronic equipment in electrical communication with a plurality of pumps, valves, and fluid sensor portions of the collection system 100. The sensors detect and/or measure the presence of rainwater, the depth of the rainwater within the vessels, and the temperature of the rainwater via measurement of the adjacent air.

Referring now to FIG. 1, a perspective view of the apparatus 10, according to a preferred embodiment of the present invention, is disclosed. The apparatus 10 includes a rectangular control enclosure assembly including a weather resistant enclosure base 20 and enclosure lid 22. The enclosure base 20 contains and secures all electrical and electronic equipment necessary to control and communicate with component portions of an entire rainwater collection system 100 including pumps, water holding vessels, valves, and sensors (see FIGS. 2 and 5).

The enclosure lid 22 further provides a transparent lid front cover 24 allowing a user to observe and operate human interface features such as pushbuttons 42a, 42b, 42c, 42d for programming and configuring the various rainwater management functions of the apparatus 10. It is understood that the front cover 24 need not be transparent. An operator panel 40 located below and parallel to the lid front cover 24 includes a plurality of flashing lamps 46a, 46b and user push buttons 42a, 42b, 42c, 42d. The lamps 46a, 46b and push buttons 42a, 42b, 42c, 42d may be accessed by releasing and pivoting the lid front cover 24 outwardly via latch hook 26a and hinge portions 28 (also see FIGS. 3a and 3b).

The lamps 46a, 46b and push buttons 42a, 42b, 42c, 42d enable a user to enter and change a variety of configuration menus to view, program, and execute various software functions and routines. A preferred embodiment of the apparatus 10 is shown here providing a first lamp 46a and a second lamp 46b, and a first pushbutton 42a, a second pushbutton 42b, a third pushbutton 42c, and a fourth pushbutton 42d. The lamps 46a, 46b provide different flashing patterns and numbers of blinks to communicate the settings of the apparatus 10 to the operator. The pushbuttons 42a, 42b, 42c, 42d allow a user to navigate through the software menus and corresponding functions, as well as input data. The menus include such function categories as, but are not limited to: system reset, flush mode configuration, valve/actuator configuration, staging tank pump configuration, pump run time configuration, test mode, troubleshooting mode, and safety settings such as a pump maximum run time and freezing temperature detection. Such categories can be blocked together to be programmed to be accessed by a single pushbutton. Such a category could include "Flush, Stage, and Protect", which would sequentially activate as an integrated configuration. Other integrated configurations could be similarly programmed.

Figure 4:
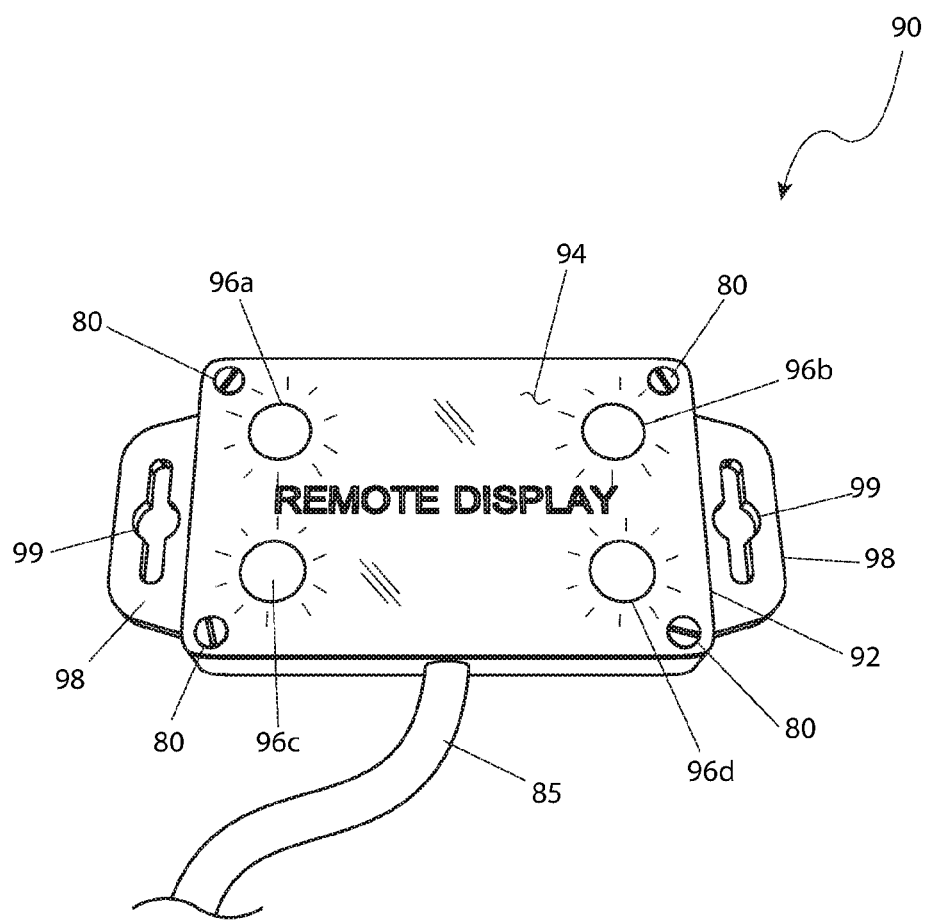
FIG. 4 is a perspective view of a remote display portion 90 of the rainwater collection system controller 10, according to a preferred embodiment of the present invention.

In a preferred embodiment, the first lamp 46a is labeled here as "ACTIVE", and is envisioned to be illuminated when the rain water collection system 10 is waiting for or has sensed a pushbutton 42a, 42b, 42c, 42d has been pressed, or the water collection system 10 is displaying something on the remote display module 90 (see FIG. 4). The second lamp 46b is labeled here as "VALUE". The second lamp 46b is envisioned to be illuminated to show system operational values or when setting system operational values. The second lamp 46b is also is on when the system 100 is calling for the pressure pump 134 to be running. The second lamp 46b is envisioned to be flashing during either a staging tank overflow management or a freezing situation.

In a preferred embodiment, the pushbuttons 42a, 42b, 42c, 42d are labeled "FLUSH", "HOLD", "PUMP", and "RESET", respectively. The first pushbutton 42a ("FLUSH") displays or sets the amount of rain to flush before collection starts. The second pushbutton 42b ("HOLD") displays or sets the length of time (in hours) to hold off the return to flush after no rain is detected. The third pushbutton ("PUMP") controls the staging pump 128 to start or stop the primary staging pump 128 manually. The fourth pushbutton 42d ("RESET") restarts the system and performs a full re-boot of the apparatus 10.

It is further envisioned that the operator panel 40 may include various indicia 48 indicating manufacturer information, instructions, or the like.

Figure 2:
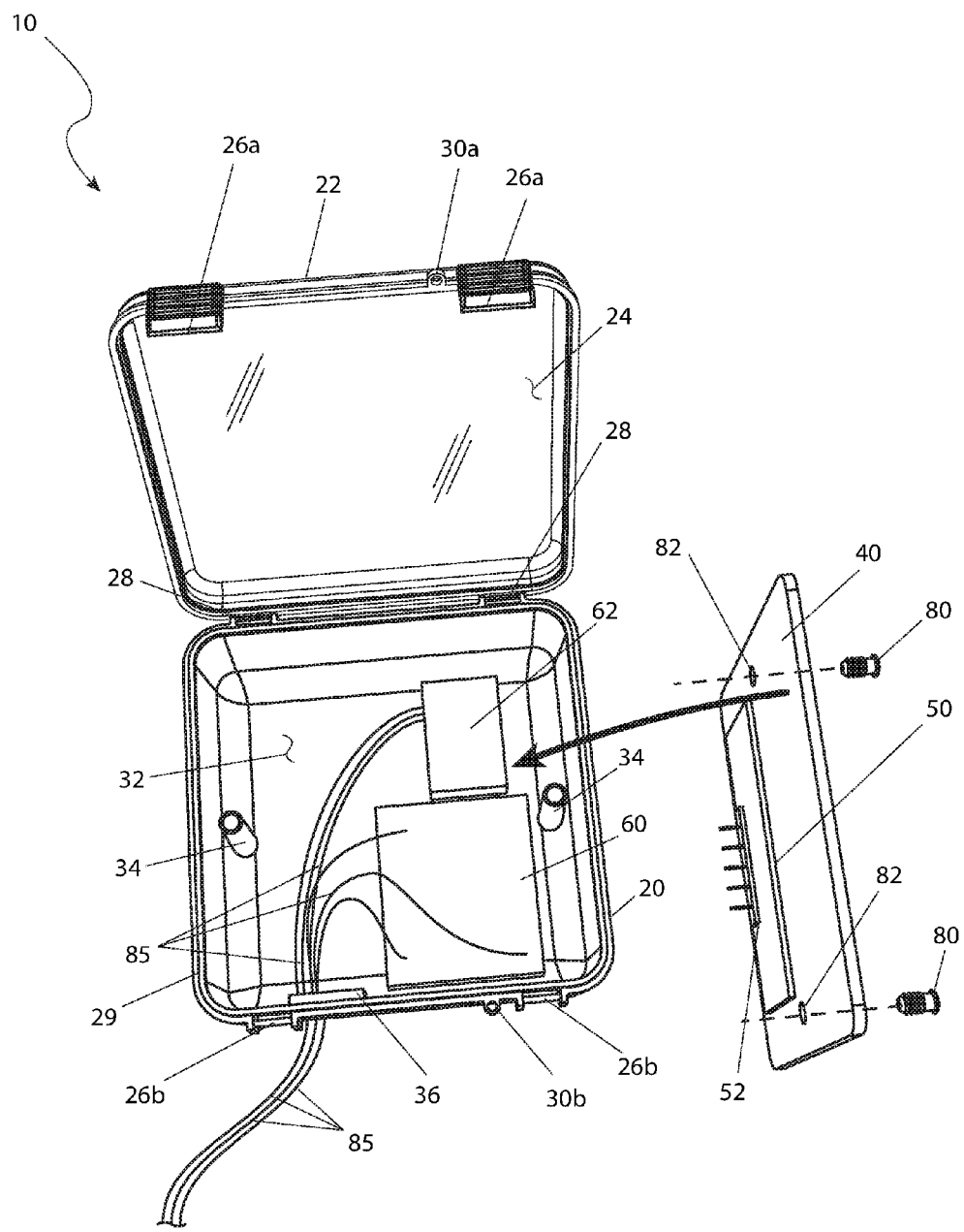
FIG. 2 is an exploded view of the rainwater collection system controller 10, according to a preferred embodiment of the present invention.

Referring now to FIG. 2, an exploded view of the rainwater collection system controller 10, according to a preferred embodiment of the present invention, is disclosed. The previously described operator panel 40 is supported within the enclosure base 20 by at least two (2) standoff posts 34, being affixed thereto via respective fasteners 80 and fastener apertures 82. The reverse side of the operator panel 40 is seen here having a first circuit board 50 affixed thereto which mechanically supports and provides power to the aforementioned lamps 46a, 46b and pushbutton portions 42a, 42b, 42c, 42d of the operator panel 40. The first circuit board 50 also provides an electrical connector 52 which enables electrical and electronic communication between the first circuit board 50 and a second circuit board 60 which is mounted to an enclosure floor portion 32 of the enclosure base 20. It is envisioned that the second circuit board 60 would provide microprocessor-based software, logic, and memory capability to the apparatus 10. In the embodiment shown here, a third circuit board 62 is also mounted to the enclosure floor 32. The third circuit board 62 is envisioned to provide power supply functions such as power conversion and management. However, it is understood that the apparatus 10 is not limited to the particular electrical and electronic configuration shown here, and an actual number of and functions of the circuit boards and associated electrical and electronic equipment may vary based upon a particular rain water system 100, and other factors, and as such should not be interpreted as a limiting factor.

Figure 5:
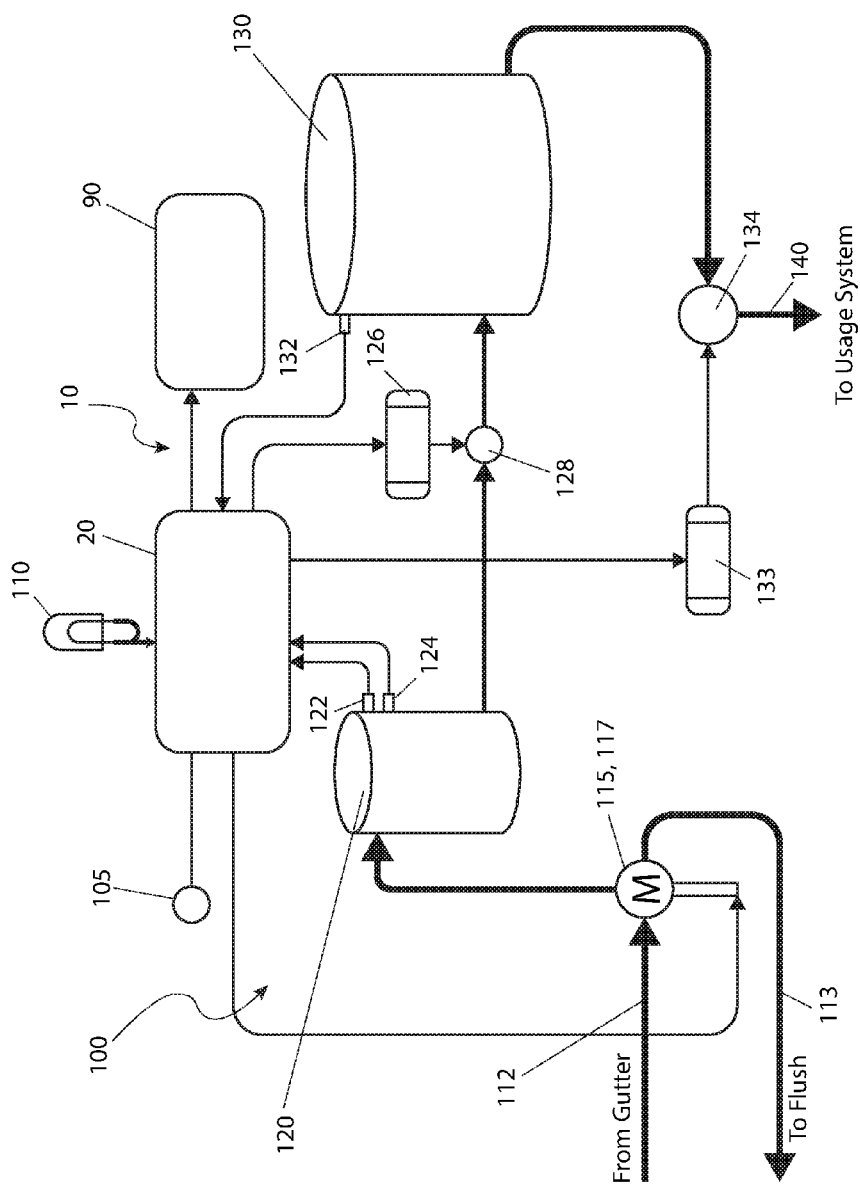
FIG. 5 is a schematic drawing depicting integration of the rainwater collection system controller 10 in a rainwater collection system 100, according to a preferred embodiment of the present invention.
Figure 7:
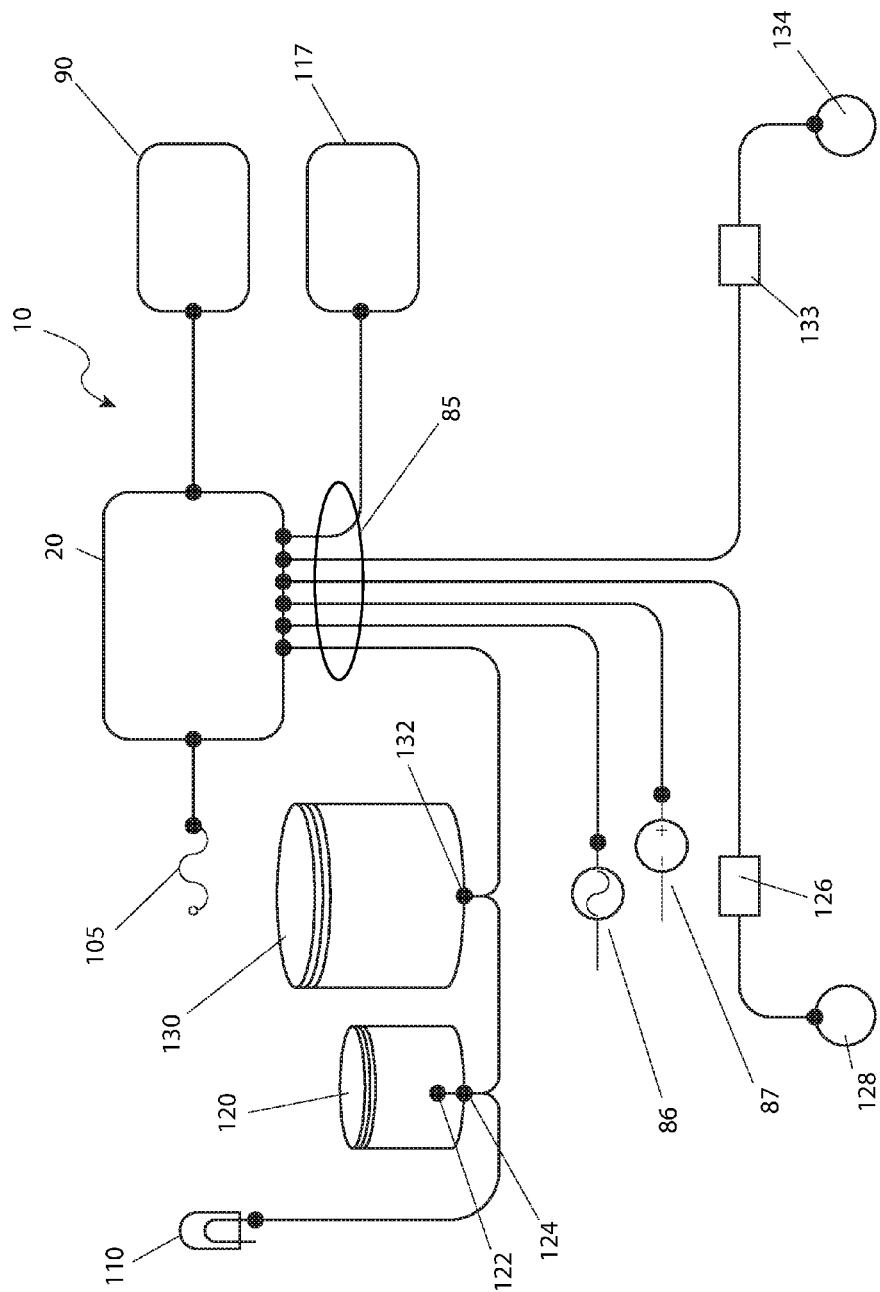
FIG. 7 is an electrical schematic drawing of the rainwater collection system controller 10, according to a preferred embodiment of the present invention; and, FIG. 8 is a partial software flow diagram of the rainwater collection system controller 10, according to a preferred embodiment of the present invention.

The enclosure 20, 22 provides electronic input and output capability throughout the rainwater collection system 100 (also see FIGS. 5 and 7). The apparatus 10 is envisioned to utilize Ethernet wiring 85 and connection hardware, thereby reducing a cost of the apparatus 10 as well as simplifying the assembly process. The wiring 85 enters the enclosure base 20 via a weather resistant rubber grommet 36 secured over a wiring aperture 88.

Additionally, the apparatus 10 includes a remote display module 90 which is in communication with the enclosure 20, 22, via additional wiring 85, and allows a user to determine a status of the major portions of the rainwater collection system 100. The remote display module 90 includes a plurality of different colored flashing lamps 96a, 96b, 96c, 96d which communicate status, information, and alerts about portions of the system to a user (see FIG. 4).

It is also considered that the apparatus 10 may communicate wirelessly with a remote display module 90 or an application on a computing device such as a smartphone or a hand-held computer tablet or desktop computer for control or monitoring of the apparatus 10 and rainwater collection system 100.

Referring now to FIGS. 3a and 3b, perspective view of the apparatus 10 depicting open and closed states of the enclosure lid portion 22, according to a preferred embodiment of the present invention, are disclosed. The enclosure base 20 and enclosure lid 22 are to be hingedly attached via a pair of hinges 28 along one (1) edge portion, preferably being molded-in interlocking appendages. The enclosure lid 22 is to be secured to the enclosure base 20 along an opposing edge using a pair of molded-in latching devices. Each latching device is envisioned to include respective latch hook 26a and latch rod 26b portions. The enclosure base 20 also includes a compressible gasket 29 all around a top open edge which seals against the enclosure lid 22 when closed to protect the contents of the apparatus 10 from harmful environmental elements such as rain or snow. It is further envisioned that the enclosure base 20 and enclosure lid 22 would include respective first padlock aperture 30a and second padlock aperture 30b portions allowing a user to install a common padlock for added security if desired.

Referring now to FIG. 4, a perspective view of a remote display portion 90 of the rainwater collection system controller 10, according to a preferred embodiment of the present invention, is disclosed. The apparatus 10 includes a remote display module 90 to communicate system status information to a user. The remote display module 90 includes a rectangular molded-plastic enclosure 92 having a pair of mounting ears 98, one (1) ear 98 being integrally molded to each opposing edge portion. Each ear 98 further includes an integral mounting aperture 99. The remote display module 90 is in communication with the apparatus 10, via additional wiring 85, and allows a user at a distance, to determine the status of the major portions of the rainwater collection system 100. The remote display module 90 includes a transparent cover 94 and a plurality of different colored lamps 96a, 96b, 96c, 96d within, illustrated here having a first remote lamp 96a, a second remote lamp 96b, a third remote lamp 96c, and a fourth remote lamp 96d. The lamp portions 96a, 96b, 96c, 96d of the remote display module 90 also use a flashing pattern method to communicate status, information, and alerts to a user about major portions of the rainwater collection system 100 such as, but not limited to: the flush/collection status, pump status, and cistern status.

Figure 6:
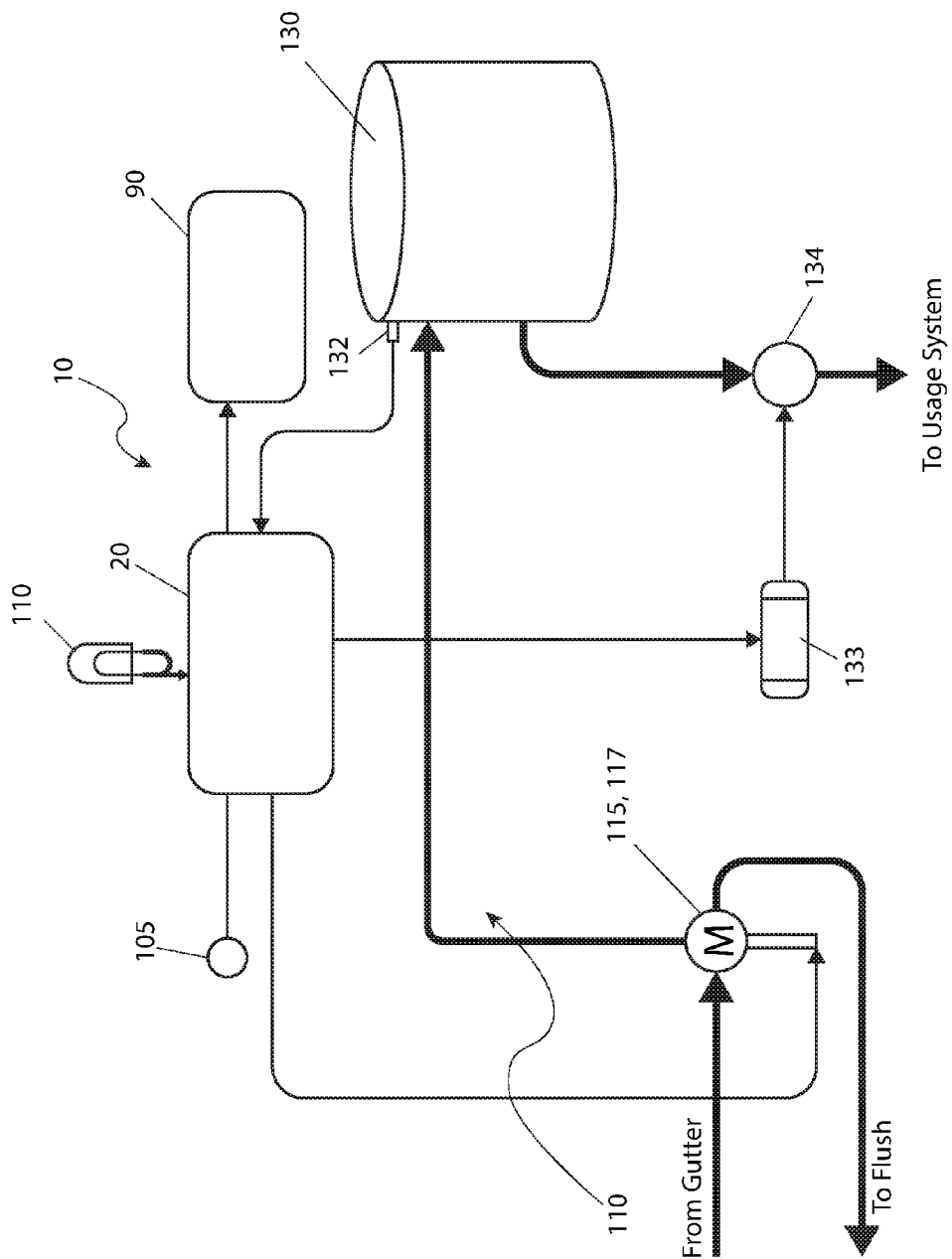
FIG. 6 is another schematic drawing depicting integration of the rainwater collection system controller 10 in an alternate rainwater collection system 101, according to a preferred embodiment of the present invention.

Referring now to FIGS. 5 and 6, plumbing and wiring schematic drawings depicting integration of the apparatus 10 in the preferred 100 and an alternate 101 rainwater collection system, are disclosed.

A typical rainwater collection system 100 is shown in FIG. 5 which includes the apparatus 10, a flush valve 115, a staging tank 120, a staging tank pump 128, a single cistern 130, and a water usage pressure pump 134. An alternate rainwater collection system 101 is shown in FIG. 6 being similar to the aforementioned rainwater collection system 100 but without the staging tank 120 and associated staging tank controller 126 and pump 128. These systems 100, 101 are intended to illustrate the capability of the apparatus 10 to control variously configured rainwater collection systems 100, 101. Additionally, the rainwater collection systems 100, 101 may also be configured to include multiple staging tanks 120 and pumps 12, and multiple cisterns 130, and as such should not be interpreted as a limiting factor.

As seen here, the apparatus 10 receives information from a plurality of input signals from various connected input devices via wiring 85 such as, but not limited to: a freeze sensor (thermometer) 105, a rain sensor 110, staging tank overflow sensor 122, staging tank full sensor 124, and a cistern full sensor 132. The apparatus 10 executes software commands based upon the user-configured parameters and the aforementioned input signals to provide output signals to control and manage various portions of the collection system 100 via additional wiring 85 including, but not limited to: a valve actuator portion 117 of the flush valve 115, a staging pump controller 126 which operates the staging pump 128, the previously described remote display module 90, and a pressure pump controller 133 which operates the pressure pump 134 to release water into a usage system line 140.

Referring now to FIG. 7, an electrical schematic drawing of the apparatus 10, according to a preferred embodiment of the present invention, is disclosed. As seen here, the apparatus 10 is in electrical communication with the major components of the rainwater collection system 100. The apparatus 10 is wired to an AC power supply and a DC power supply 87 so as to provide the correct power type and voltage to the various components of the apparatus 10 (see FIG. 2).

Figure 8:
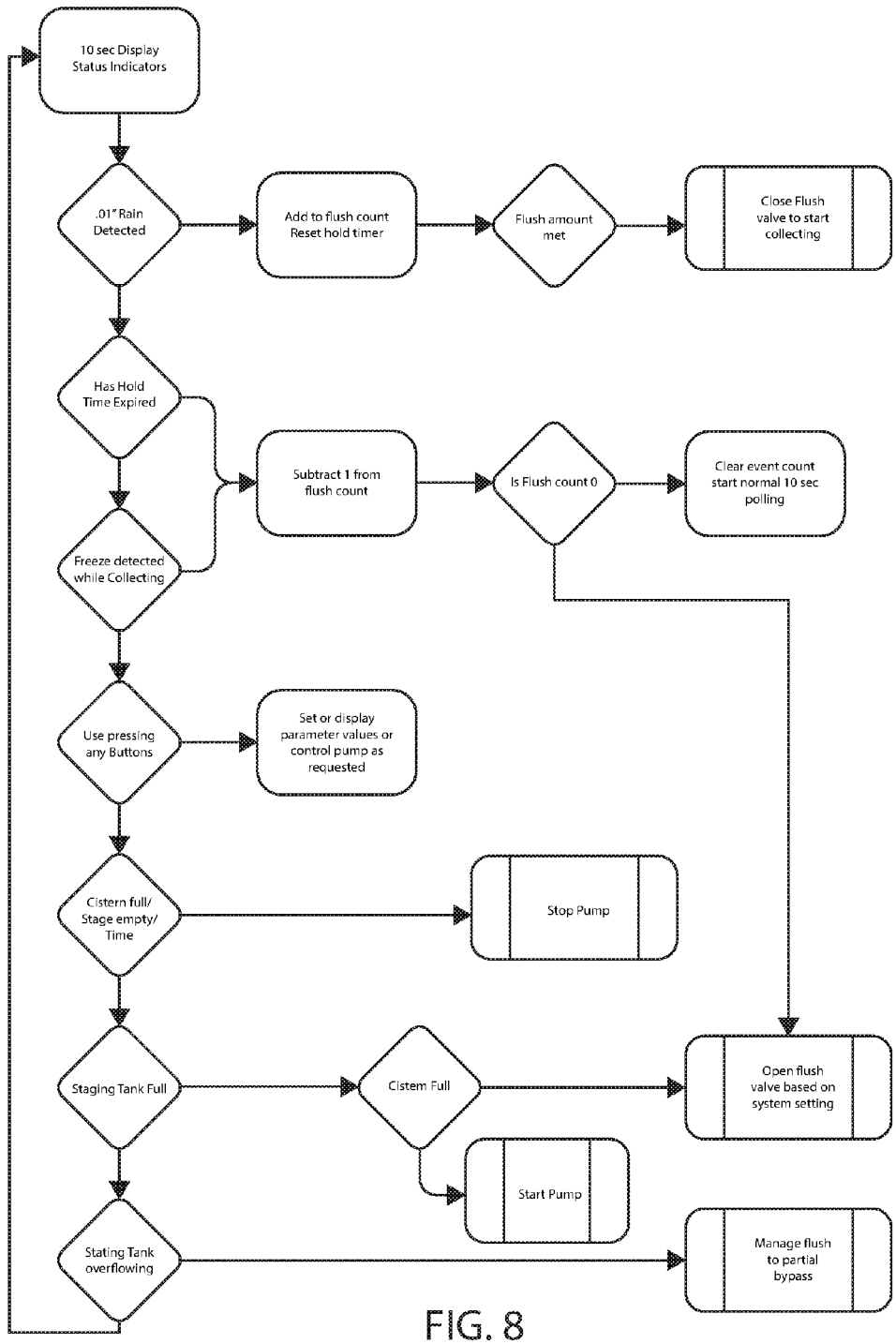

Referring now to FIG. 8, a partial software flow diagram of the rainwater collection system controller 10, according to a preferred embodiment of the present invention, is disclosed. The flow diagram shown here is intended to provide a sample portion of the software capability of the apparatus 10. The flow diagram illustrates a possible software sequence for the flushing process being controlled by the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 5 and 6.

The method of installing the apparatus 10 may be achieved by performing the following steps: procuring the apparatus 10; mounting the apparatus 10 to a conveniently located structure; mounting the remote display module 90 at a second location some distance from the apparatus 10; establishing all electrical connections from the apparatus 10 to the portions of the rainwater collection system 100, using Ethernet or equivalent wiring 85, such as the freeze sensor (thermometer) 105, the rain sensor 110, the staging tank overflow sensor 122, the staging tank full sensor 124, the cistern full sensor 132, the valve actuator portion 117 of the flush valve 115, the staging pump controller 126 which operates the staging pump 128, the remote display module 90, and the pressure pump controller 133 which operates the pressure pump 134; establishing electrical connections from the apparatus 10 to an AC power supply 86 and a DC power supply 87.

The method of utilizing the apparatus 10 may be achieved by utilizing the pushbuttons 42a, 42b, 42c, 42d located upon the operator panel 40 to perform various functions such as pressing the first pushbutton 42a ("FLUSH") to display or sets the amount of rain to flush before collection starts; pressing the second pushbutton 42b ("HOLD") to display or set the length of time to hold off the return to flush after no rain is detected; pressing the third pushbutton ("PUMP") to manually start or stop the staging pump 128; pressing the fourth pushbutton 42d ("RESET") to re-boot of the apparatus 10; observing the flashing of the first lamp 46a and the second lamp 46b to confirm the aforementioned pushbutton commands; observing the flashing remote lamp portions 96a, 96b, 96c, 96d of the remote display module 90 to communicate status, information, and alerts to a user about major portions of the rainwater collection system 100.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A controller configured to be in electrical communication with a rainwater collection system, said controller comprising:
   an enclosure base defining an interior;
   a lid removably secured above an opening within said enclosure base fully covering said interior;
   an operator panel supported within said interior of said enclosure base comprising:
      a plurality of lamps disposed within a first face thereof; and,
      a plurality of actuators disposed within said first face thereof and adjacent said plurality of lamps;
      a first circuit board secured to a second face of said operator panel opposite said first face and in electrical communication with said plurality of lamps and said plurality of actuators;
      a second circuit board secured to a bottom interior portion of said enclosure base and in electrical communication with said first circuit board, further comprising software stored thereon; and,
      a third circuit board secured to a bottom interior portion of said enclosure base adjacent said second circuit board and in electrical communication between said first and second circuit boards and a power source; and,
   a remote display module in electrical communication with said operator panel;
   wherein said operator panel is configured to be in electrical communication with a plurality of data collecting sensors of said rainwater collection system;
   wherein said plurality of lamps displays sensed data from said data collecting sensors;
   wherein said first circuit board supports said operator panel and supplies power to said plurality of lamps and said plurality of actuators;
   wherein said plurality of actuators enable navigation of software stored within said second circuit board, thereby capable of permitting a user to actuate any one of a plurality of components of said rainwater collection system in response to sensed data from said data collecting sensors; and,
   wherein said third circuit board performs power conversion and power management for said controller.

2. The controller system of claim 1, wherein said operating panel further comprises:
   a first lamp configured to illuminate when said rainwater collection system is waiting to operate, has sensed any actuator has been depressed, or said data collecting sensors are displaying information relative to a condition of a component of said rainwater collection system;
   a second lamp configured to illuminate when any pump of said rainwater collection system needs to be operating based on an operating value stored in said software, when any tank of said rainwater collection system requires overflow management or when ambient temperature about said rainwater collection system reaches a pre-set temperature stored on said software;
   a first actuator configured to display on said remote display module an amount of rainwater to flush from said rainwater collection system prior to collection of fresh rainwater and flush said amount;
   a second actuator configured to display on said remote display module an amount of time to hold off a rainwater collection system flush after zero rainwater is detected in any rainwater collection system tank;
   a third actuator configured to selectively activate any pump of said rainwater collection system; and,
   a fourth actuator configured to activate said rainwater collection system and perform a full re-boot of said controller.

3. The controller of claim 2, wherein said operating panel further comprises:
   a flush actuator configured to be in electrical communication with a flush valve in fluid communication with a rainwater supply line, a flush water line, and a cistern of said rainwater collection system;
   a pressure pump actuator configured to be in electrical communication with a pressure pump in fluid communication with said cistern and a usage line;
   wherein said first lamp is illuminated when a sensed moisture reaches a pre-set moisture value stored in said software; and, wherein said second lamp is illuminated when said ambient temperature reaches a pre-set temperature value stored in said software.

4. The controller of claim 3, wherein said operating panel is in further electrical communication with:
- a staging tank overflow sensor configured to be in communication with a staging tank of said rainwater collection system;
- a staging tank full sensor configured to be in communication with said staging tank;
- a staging pump controller configured to be in communication with a staging pump of said rainwater collection system and in fluid communication between said staging tank and said cistern;
- a cistern full sensor configured to be in communication with said cistern;
- a freeze sensor configured to be in communication with said rainwater collection system capable of measuring and transmitting data regarding sensed ambient temperature in proximity to said freeze sensor; and,
- a rain sensor configured to be in communication with said rainwater collection system capable of measuring and transmitting data regarding sensed moisture in proximity to said rain sensor;
- wherein activation of said third actuator selectively starts or stops said staging pump.

5. The controller of claim 1, wherein said remote display module comprises:
- a remote display enclosure;
- a pair of mounting ears each secured on an opposing side of said remote display enclosure;
- a mounting aperture secured within each said mounting ear;
- a cover; and,
- a plurality of remote display lamps disposed within a face of said remote display enclosure and subjacent said cover;
- wherein said remote display lamps are each in electrical communication with said second circuit board and are configured to correspond to an assigned one of said plurality of components of said rainwater collection system and an assigned one of said plurality of data collecting sensors;
- wherein each of said remote display lamps is illuminated when a respective component of said rain water collection system is activated; and,
- wherein each of said remote display lamps is activated when sensed data from a respective data collecting sensor matches a pre-set value stored on said software.

6. The controller of claim 5, wherein said plurality of remote display lamps further comprise:
- a first remote lamp;
- a second remote lamp;
- a third remote lamp; and,
- a fourth remote lamp;
- wherein each of said first, second, third and fourth remote lamps comprise a different color; and,
- wherein said first, second, third and fourth remote lamps flash a pattern when activated.

7. The controller of claim 1, wherein said lid comprises:
- a transparent body;
- a pair of hinges on a first side of said body;
- a pair of latch hooks secured on a side of said body opposite said first side; and,
- a first pad lock aperture adjacent an interior side of one said latch hook.

8. The controller of claim 7, wherein said enclosure base comprises a pair of latch bars positioned to removably secure each said latch hook therein when said lid is in a closed position.

9. The controller of claim 7, wherein said enclosure base comprises a second pad lock aperture adjacent an interior side of one said latch bar positioned to align with said first pad lock aperture.

10. The controller of claim 1, wherein said power supply is AC and DC.

11. A controller configured to be in electrical communication with a rainwater collection system, said controller comprising:
- an enclosure base defining an interior;
- a lid removably secured above an opening within said enclosure base fully covering said interior;
- an operator panel supported within said interior of said enclosure base comprising:
  - a plurality of lamps disposed within a first face thereof; and,
  - a plurality of actuators disposed within said first face thereof and adjacent said plurality of lamps;
- a first circuit board secured to a second face of said operator panel opposite said first face and in electrical communication with said plurality of lamps and said plurality of actuators;
- a second circuit board secured to a bottom interior portion of said enclosure base and in electrical communication with said first circuit board, further comprising software stored thereon; and,
- a third circuit board secured to a bottom interior portion of said enclosure base adjacent said second circuit board and in electrical communication between said first and second circuit boards and a power source; and,
- a remote display module in wireless communication with said operator panel;
- wherein said operator panel is configured to be in electrical communication with a plurality of data collecting sensors of said rainwater collection system;
- wherein said plurality of lamps displays sensed data from said data collecting sensors;
- wherein said first circuit board supports said operator panel and supplies power to said plurality of lamps and said plurality of actuators;
- wherein said plurality of actuators enable navigation of software stored within said second circuit board, thereby capable of permitting a user to actuate any one of a plurality of components of said rainwater collection system in response to sensed data from said data collecting sensors; and,
- wherein said third circuit board performs power conversion and power management for said controller.

12. The controller system of claim 11, wherein said operating panel further comprises:
- a first lamp configured to illuminate when said rainwater collection system is waiting to operate, has sensed any actuator has been depressed, or said data collecting sensors are displaying information relative to a condition of a component of said rainwater collection system;
- a second lamp configured to illuminate when any pump of said rainwater collection system needs to be operating based on an operating value stored in said software, when any tank of said rainwater collection system requires overflow management or when ambient temperature about said rainwater collection system reaches a pre-set temperature stored on said software;

a first actuator configured to display on said remote display module an amount of rainwater to flush from said rainwater collection system prior to collection of fresh rainwater and flush said amount;

a second actuator configured to display on said remote display module an amount of time to hold off a rainwater collection system flush after zero rainwater is detected in any rainwater collection system tank;

a third actuator configured to selectively activate any pump of said rainwater collection system; and, a fourth actuator configured to activate said rainwater collection system and perform a full re-boot of said controller.

13. The controller of claim 12, wherein said operating panel further comprises:

a flush actuator configured to be in electrical communication with a flush valve in fluid communication with a rainwater supply line, a flush water line, and a cistern of said rainwater collection system;

a pressure pump actuator configured to be in electrical communication with a pressure pump in fluid communication with said cistern and a usage line;

wherein said first lamp is illuminated when a sensed moisture reaches a pre-set moisture value stored in said software; and, wherein said second lamp is illuminated when said ambient temperature reaches a pre-set temperature value stored in said software.

14. The controller of claim 13, wherein said operating panel is in further electrical communication with:

a staging tank overflow sensor configured to be in communication with a staging tank of said rainwater collection system;

a staging tank full sensor configured to be in communication with said staging tank;

a staging pump controller configured to be in communication with a staging pump of said rainwater collection system and in fluid communication between said staging tank and said cistern;

a cistern full sensor configured to be in communication with said cistern;

a freeze sensor configured to be in communication with said rainwater collection system capable of measuring and transmitting data regarding sensed ambient temperature in proximity to said freeze sensor; and, a rain sensor configured to be in communication with said rainwater collection system capable of measuring and transmitting data regarding sensed moisture in proximity to said rain sensor;

wherein activation of said third actuator selectively starts or stops said staging pump.

15. The controller of claim 11, wherein said remote display module comprises:

a remote display enclosure;

a pair of mounting ears each secured on an opposing side of said remote display enclosure;

a mounting aperture secured within each said mounting ear;

a cover; and, a plurality of remote display lamps disposed within a face of said remote display enclosure and subjacent said cover;

wherein said remote display lamps are each in electrical communication with said second circuit board and are configured to correspond to an assigned one of said plurality of components of said rainwater collection system and an assigned one of said plurality of data collecting sensors;

wherein each of said remote display lamps is illuminated when a respective component of said rain water collection system is activated; and, wherein each of said remote display lamps is activated when sensed data from a respective data collecting sensor matches a pre-set value stored on said software.

16. The controller of claim 15, wherein said plurality of remote display lamps further comprise:

a first remote lamp;

a second remote lamp;

a third remote lamp; and, a fourth remote lamp;

wherein each of said first, second, third and fourth remote lamps comprise a different color; and, wherein said first, second, third and fourth remote lamps flash a pattern when activated.

17. The controller of claim 11, wherein said lid comprises:

a transparent body;

a pair of hinges on a first side of said body;

a pair of latch hooks secured on a side of said body opposite said first side; and, a first pad lock aperture adjacent an interior side of one said latch hook.

18. The controller of claim 17, wherein said enclosure base comprises a pair of latch bars positioned to removably secure each said latch hook therein when said lid is in a closed position.

19. The controller of claim 17, wherein said enclosure base comprises a second pad lock aperture adjacent an interior side of one said latch bar positioned to align with said first pad lock aperture.

20. The controller of claim 11, wherein said power supply is AC and DC.

* * * * *